(12) United States Patent
Shoup

(10) Patent No.: US 6,205,937 B1
(45) Date of Patent: Mar. 27, 2001

(54) FOLDING PLANTER FRAME

(76) Inventor: Kenneth E. Shoup, P.O. Box 121, Bonfield, IL (US) 60913

( * ) Notice: Subject to any disclaimer, the term of this patent is extended or adjusted under 35 U.S.C. 154(b) by 0 days.

(21) Appl. No.: 09/498,975

(22) Filed: Feb. 7, 2000

(51) Int. Cl.[7] .................................................. A01B 73/04
(52) U.S. Cl. ............................. 111/54; 111/57; 172/311; 172/452
(58) Field of Search .................... 111/54, 52, 53, 111/55, 57, 59, 60, 66; 172/452, 458, 662, 311

(56) References Cited

U.S. PATENT DOCUMENTS

| | | | |
|---|---|---|---|
| 4,137,852 | 2/1979 | Pratt | 111/57 |
| 4,340,239 | 7/1982 | Shoup . | |
| 4,364,581 | 12/1982 | Shoup | 172/311 X |
| 4,461,356 * | 7/1984 | Larson | 111/57 X |
| 4,504,076 | 3/1985 | Bedney | 172/311 X |
| 4,529,040 * | 7/1985 | Grollimund | 111/57 X |
| 4,582,143 | 4/1986 | Pratt | 172/311 |
| 4,596,290 | 6/1986 | Bedney | 172/311 |
| 4,607,708 | 8/1986 | Landphair et al. | 172/311 X |
| 4,648,334 | 3/1987 | Kinzenbaw | 111/52 |
| 4,664,202 * | 5/1987 | Applequist et al. | 111/57 X |
| 4,721,168 | 1/1988 | Kinzenbaw | 172/311 |
| 4,871,028 | 10/1989 | Murray | 172/248 |
| 5,024,279 | 6/1991 | Warner et al. . | |
| 5,062,489 * | 11/1991 | Adee | 111/57 X |
| 5,406,897 | 4/1995 | Pingry . | |
| 5,488,996 | 2/1996 | Barry et al. . | |
| 5,535,688 * | 7/1996 | Kaufman | 111/52 |
| 5,577,563 * | 11/1996 | Holen | 111/57 X |
| 5,647,440 * | 7/1997 | Barry et al. | 111/57 X |
| 5,921,325 * | 7/1999 | Meek et al. | 111/52 X |
| 6,035,942 * | 3/2000 | Smith et al. | 111/57 X |

* cited by examiner

Primary Examiner—Christopher J. Novosad
(74) Attorney, Agent, or Firm—Emrich & Dithmar

(57) ABSTRACT

An agricultural device for transporting planting units which has a first stationary toolbar and a pair of toolbars spaced away and separate from the stationary toolbar and carrying a plurality of planting units thereon at fixed intervals. The pair of toolbars are moved between a first position where the fixed toolbar and the pair of toolbars are positioned with their longitudinal axes generally colinear and a second position where the pair of toolbars are spaced from the fixed toolbar and the longitudinal axes of the fixed toolbar and the pair of toolbars are parallel. The agricultural device is incapable of positioning the planting units carried thereby in at least two different spacings depending upon whether the pair of toolbars are in the first or the second positions thereof.

26 Claims, 7 Drawing Sheets

FOLDING PLANTER FRAME

BACKGROUND OF THE INVENTION

As the size of farms has grown and improvements have been made in agricultural methods permitting the farmer to perform farming functions more efficiently, equipment has been developed and is used for performing most agricultural functions on a multiple row basis. As larger and larger equipment became available enabling the farmer to perform a particular function on many rows in a single pass, it became increasingly difficult for the farmer to transport this wide equipment over the road to his fields. Thus, folding toolbars have been developed which serve the purpose of reducing the overall width of the multiple row equipment. Typically, the outer ends or wings of the toolbar are constructed so as to permit them to be folded approximately 90° upward, forward or rearward from their extended position. In many instances, these folded toolbars provide a configuration that is relatively unstable rendering them somewhat unsafe when transported over the road.

More importantly, when the toolbar is folded, the orientation of the tools or other components attached to the toolbar is completely altered rendering them useless in the folded position.

In the cornbelt the most popular corn row width is 30 inch, but for soybeans the trend is toward a row width of 15 inch. Frequently, both crops are grown by the same farmers. Thus, planting crops in two different row widths requires that the farmer purchase and maintain two specialized planters or that substantial mechanical modifications be performed on a single planter to prepare it for the different row widths. While some manufacturers offer removable attachments or a removable tandem unit with planters attached, the tandem units (which serve to divide the frontrow width) are of no use during the planting of the wider row crop.

There is therefore a need for an improved toolbar which will provide a stable unit during transportation in a folded position. There is further need for a toolbar which easily, efficiently and completely converts to use in either row width. It is highly desirable then, that when in the folded position, the toolbar can perform a useful function such as narrow row (or inter-row) planting.

SUMMARY OF THE INVENTION

This invention relates to a planter frame in which a plurality of planting and tillage units are mounted on a non-movable frame member and on two movable frame members so as to provide two different spacings, 30 inch spacing for corn and a 15 inch spacing for soybeans. Additionally, the invention relates to a device which also has a travel position in which in the profile of the device is narrower than in the 15 inch planting position to provide a better rotation configuration.

According it is an object of the present invention to provide an agricultural device for transporting planting units having containers for storing and dispensing seed, fertilizer, and the like, including tillage attachments through a field at difference spacings by motor vehicle wherein the different spacings are accommodated by swinging movements of toolbars, both laterally and vertically from position to another.

Yet another object of the present invention is to provide an agricultural device of the type set forth with second and third toolbars are provided spaced and separate from the first toolbar and hydraulic mechanism is provided in communication with the second and third toolbars for moving them between a first position when all three toolbars are in position with their longitudinal axis generally co-linear and a second position when the second and third toolbars are hydraulically elevated and thereafter spaced from the first toolbar such that the longitudinal axis of the first toolbar is parallel to the longitudinal axis of the second and third toolbars.

Another object of the invention of the invention is to provide a agricultural device of the type set forth in which the hydraulic mechanism is capable of positioning one of multiple toolbars in two different fixed positions with respect to another one of the toolbars, one of the fixed positions being an operating position wherein the agricultural device is capable of performing agricultural passes and the other fixed position is a transportation position wherein the overall width of the agricultural device is reduced during transportation along roads and highways.

Finally, another object of the invention is to provide an agricultural device for transporting planting units having containers for storing and dispensing seed, fertilizer and the like including tillage attachments through a field at different spacings including a tongue connection to a motored vehicle, a first toolbar having a longitudinal axis extending generally perpendicularly to the direction of travel of the motored vehicle and carrying a plurality of planting units mounted thereon at fixed intervals, a sleeve mounted for sliding movement on said tongue having a cross piece fixed thereto for sliding movement on said tongue toward and away from said first toolbar, second and third toolbars spaced from said first toolbar and each having a longitudinal axis extending generally parallel to said first toolbar and each carrying a plurality of planting units thereon at fixed intervals, struts pivotally connected to said cross piece and said second and third toolbars, hydraulic mechanism in communication with said sleeve and said second and third toolbars for moving said second and third toolbars between a first position wherein said first, second and third toolbars are positioned with their longitudinal axes generally co-linear and a second position wherein said sleeve moves relative to said first toolbar with said second and third toolbars being elevated to pass over at least some planting units mounted on said first toolbar and thereafter spaced from said first toolbar such that the longitudinal axis of said first, toolbar, said second and third toolbars in the second positions thereof positioning the planting units carried thereon intermediate the planting units carried on said first toolbar, whereby to provide an agricultural device capable of positioning the planting units carried thereby in at least two different spacings depending upon whether said second and third toolbars are in the first or the second positions thereof.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
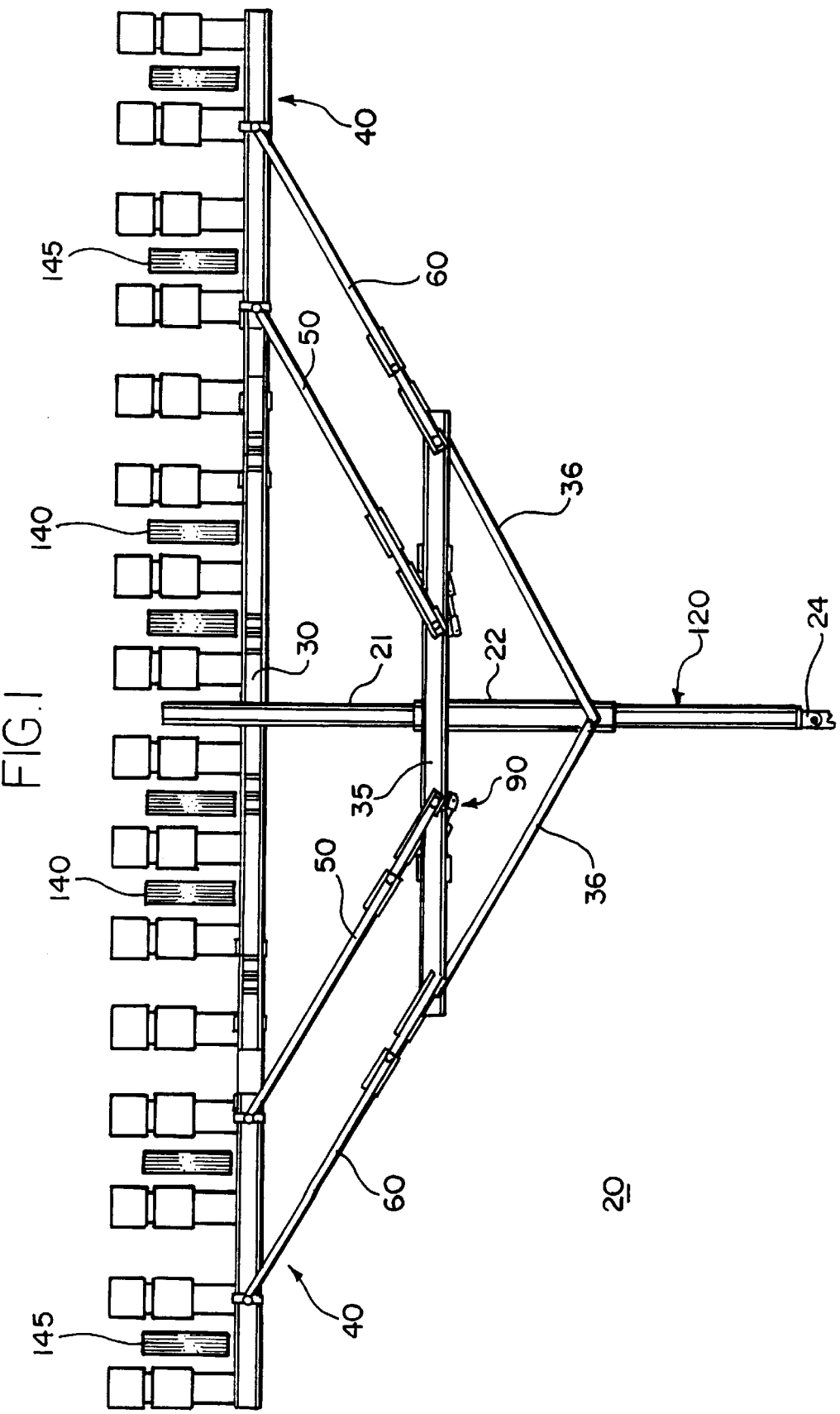
FIG. 1 is a plan view of the planter frame in the corn planting condition.
Figure 2:
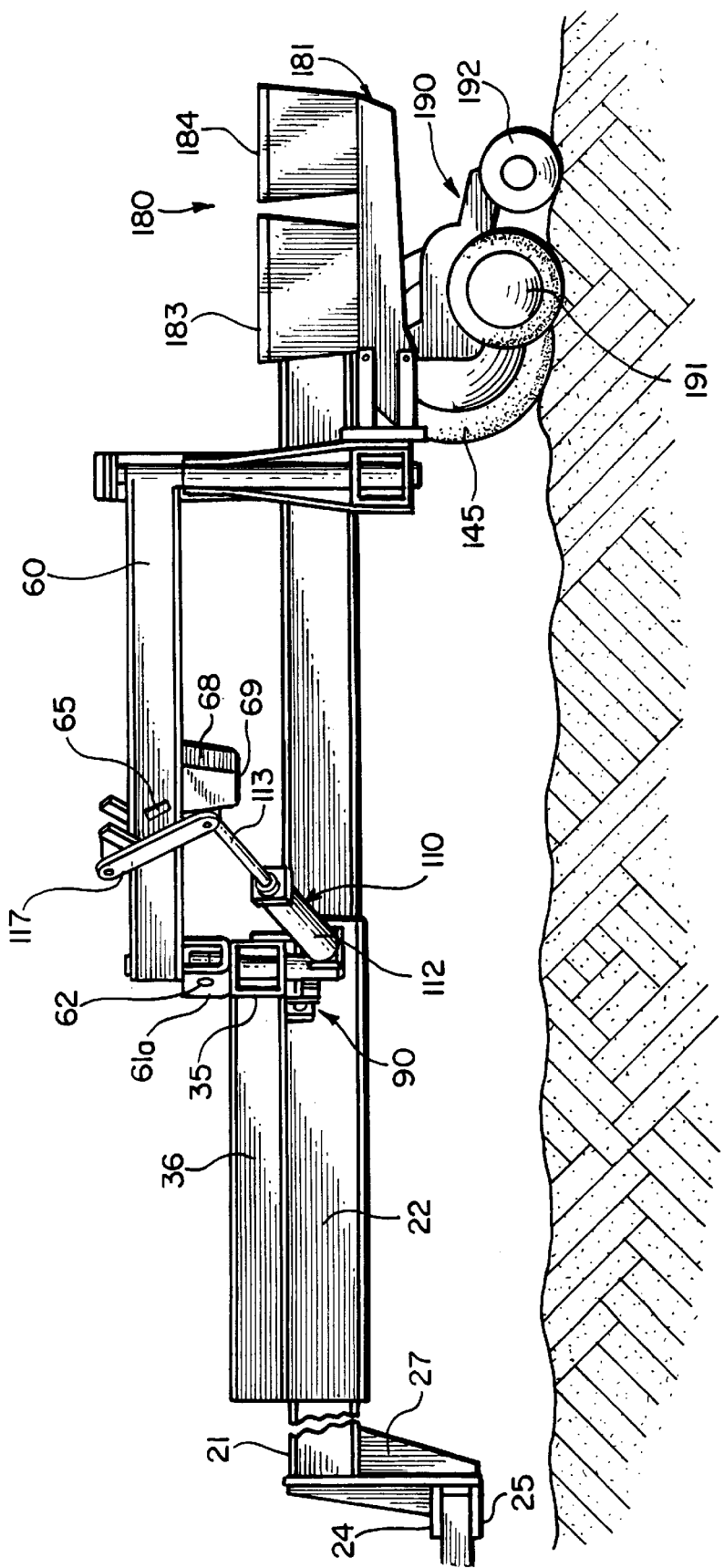
FIG. 2 is a side elevational view of the planter in the position illustrated in FIG. 1.

Referring now to the drawings, there is disclosed a folding planter frame 20 which includes an elongated center tube 21 which is generally hollow and square in transverse cross-section and has provided therearound a short tubular section or sleeve 22 which is dimensioned to slide with respect to the tube 21. A pair of horizontally extending apertured mounting plates 24 and 25 are fixedly welded to a vertically extending plate 26 at the front end of the tube 21, for connection to a tractor type vehicle, all as is well known in the art. A fixed cross member or toolbar 30 is fixedly welded to the bottom of tubular frame member 21 and a tubular frame member 35 is fixedly welded to the top of the slidable tubular frame member or sleeve 22. The cross bar or frame member 35 is provided with diagonally extending brace members 36 which interconnect the forward end of the tube 22 with the cross bar or frame member 35 near the ends thereof to form a relative rigid construction movable with respect to the center tubular frame member 21.

Referring now to drawings 1 to 4, there is shown left and right wing members or toolbars 40. The toolbars or wing members 40 are identical in construction and operation and therefore, only one will be described, it being understood that the operation of each wing bar is the same and the movement thereof is the same. The wing member 40 is a piece of tubular material substantially the same as the crossbars 30 and 35 and is connected to the folding planter frame 20 and more particularly to the movable cross bar 35 by means of an inboard or inner strut 50 connected to the cross bar 35 by means of a apertured clevis 51 having a pair of arms 51a having aligned apertures therein. A pin 52 extends through the apertures in clevis arms 51a and through the strut 50 pivotally to mount the strut 50 to the clevis 51 for relative movement of the strut 50 with regard to the cross bar 35. A pin 53 extends downwardly through the strut 50 for horizontal movement of the strut 50 with respect to the cross bar 35. Have shaft 51d extends from the base of the clevis 51 through aligned apertures in the top and bottom surfaces of the member 35 and is surrounded by a bearing 51e for rotational movement of the strut 50 with respect to the member 35. The shaft 51d is provided with an aperture 51f at the bottom thereof, for a purpose hereafter set forth. A pivot pin 54 is at the outboard end of the inboard strut 50 and is received in a shaft 56 which extends vertically from the strut 50 to the wing member 40. A strap 57 connects the shaft 56 to the wing member 40 and wraps therearound securely.

Finally, a pair of stops 58 angularly disposed with respect to the longitudinal axis of the inboard strut 50 are mounted on opposite sides of the strut 50 for a purpose hereinafter set forth.

An outboard strut 60 extends from near the outboard end of the cross piece 35 to the right wing member 40. The outboard strut 60 is connected at the inboard end to a apertured clevis 61 in the same manner as the inboard strut 50 is connected to the clevis 51 and pin 54. The outboard strut 60 moves in the same manner as the inboard strut 50. At the outboard end of the outboard strut 60 is a pivot 64 similar in shape and construction to the pivot pin 54 extending into a shaft 66 which is connected to the wing member 40 by straps 67, similar to the straps 57, securely to connect the wing member 40 to the outboard strut 60. At the outboard end of the strut 60 is a pivot pin 63 similar to the pivot pin 53 and for the same purpose. At the bottom of the outboard strut 60 is a rest member 68 which preferably is a section of the same tubular material which forms the strut 60 having a rest surface 69 at the bottom thereof. Finally, a pair of stops 65 are arranged on the outer surfaces of the outboard strut 60 and extend outwardly therefrom for a purpose hereinafter set forth.

The fixed crossbar 30 is provided with an inner stand 70 and an outer stand 80. The inner or inboard stand 70 includes an inboard or upper notch 71 and an outboard or lower notch 72. An angular flange 73 extends inwardly from the stand 70 and a divider piece 74 separates the upper notch 71 from the lower notch 72. Finally, an angular flange 76 extends outboard of the stand 70 from the lower notch 72.

An outer or outboard stand 80 is similarly constructed to the inner or inboard stand 70 and is provided with an upper inboard notch 81 and a lower outboard notch 82, the inboard notch 81 having an inwardly extending flange 83 with a divider 84 between the inner and outer notches 81 and 82, respectively, and finally an angular flange 86 extends outboard of the lower notch 82. It should be observed that the lower notch 82 is positioned sufficiently low enough to accommodate the rest member 68 thereon, as will be explained.

Figure 3:
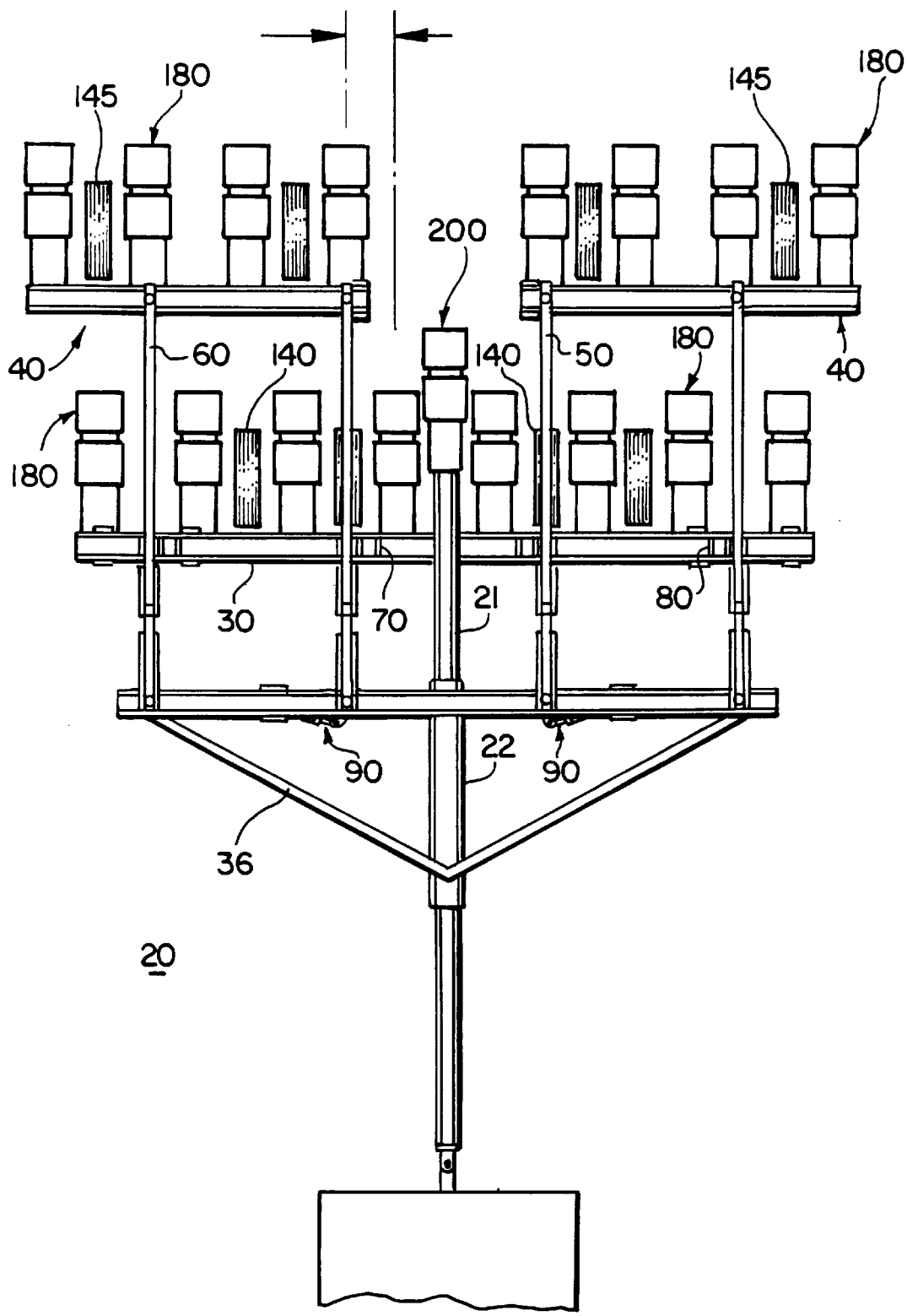
FIG. 3 is a plan view of the planter frame in the narrow or soybean planting condition.
Figure 6:
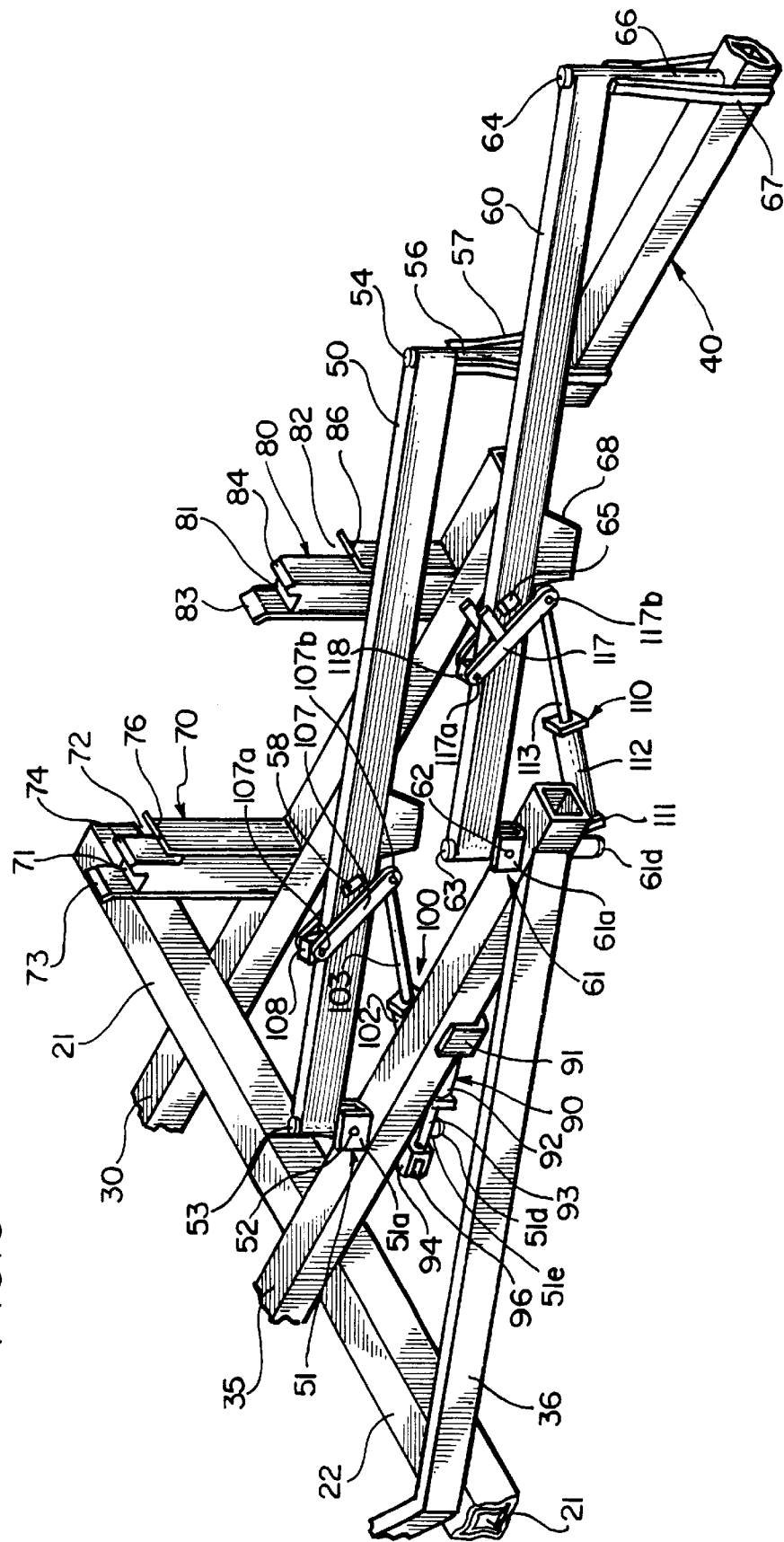
FIG. 6 is an enlarged portion side elevational view of the planter frame members in the corn planting condition.

In order to facilitate movement of the wing members 40 between the 30 inch corn planting position illustrated in FIG. 1 and the 15 inch soybean planting position illustrated in FIG. 3, there is provided a swing cylinder 90 mounted on the underside of the movable member 35 as illustrated in FIG. 6. The swing cylinder 90 is connected to a bracket 91 mounted to the movable cross member 35 and includes a cylinder 92 having a hydraulically operated piston 93 extending therefrom terminating at have 94 which is pivotally connected to an arm 96 fixedly connected to the shaft 51d or opening (not shown) so that movement of the piston shaft 93 causes the pin 53 to rotate thereby causing the wing member 40 to swing between the position illustrated in FIG. 1 and the position illustrated in FIG. 3. The arm 96 connected to the shaft 51d is maintained in place in the clevis 94 by means of a pivot pin (not shown).

Figure 5:
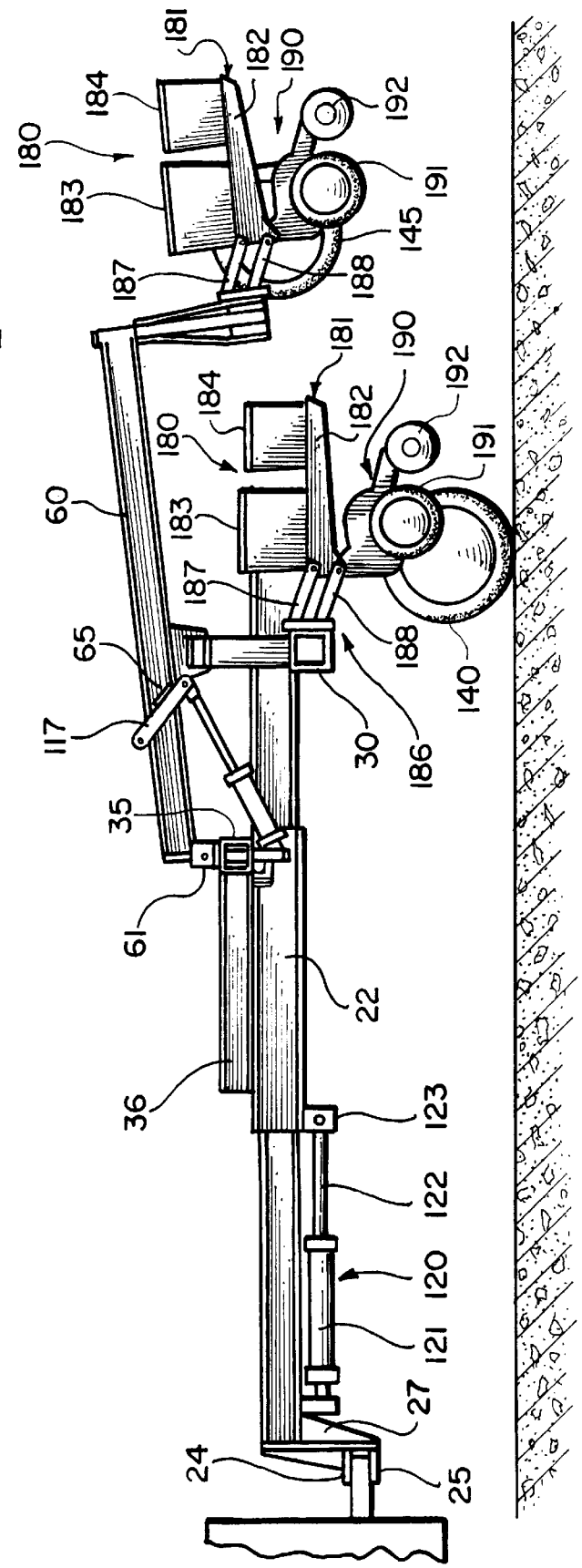
FIG. 5 is a side elevational view of the planter in the road transport condition.

In order to effect movement of the wing member 40 from the 30 inch corn planting position of FIG. 1 to the 15 inch soybean planting position of FIG. 3 or for that matter, to the transport position with is inboard of the 15 inch planting position shown in FIG. 5, the wing members 40 must be moved rearwardly and elevated with respect to the center unit 30 and more particularly, the wing members 40 must be elevated so that the inboard strut 50 and the outboard strut 60 can pass over the fixed cross bar 30 and the devices mounted thereupon. In order to elevate the wing members 40 and the devices carried thereon, there is provided an inboard lift cylinder 100, best seen in FIGS. 1 and 6, that is mounted at one end thereof to the pin 51d and includes a hydraulic cylinder body 102 having a piston 103 extending therefrom. The end of the piston 103 away from the cylinder body 102 is pivotally mounted to a pair of links 107 by means of a pivot pin 107b. The links 107 are pivotally mounted by a pin 107a to a mounting block 108 fixedly mounted to the top of the inboard strut 50. During lifting, the links 107 come in contact with the stop members 58, as will be described.

There is further provided an outboard lift cylinder 110 which is preferably slaved to the inboard lift cylinder 100 so that the two cylinders operate together. The outboard lift cylinder 110 includes a mounting bracket 111 connected to a shaft 61d like shaft 51d and includes a cylinder body 112 having a piston 113 extending outwardly therefrom. Mechanism 114 connects the cylinder body 112 to the bracket 111 and is provided with a pivot pin (not shown) which allows the cylinder 112 to pivot rotationally with respect to the shaft 63. The outer end of the piston 113 is pivotally connected to two links 117 by means of a pivot pin 117b. At the other end of the links 117a pivot pin 117a pivotally connects the links to a fixture 118 fixedly mounted to the top of the outboard strut 60, such as by welding. During operation of the outboard lift cylinder 110, the links 117 contact the stop members 65 mounted on the opposite sides of the outboard strut 60, as will be explained.

Figure 4:
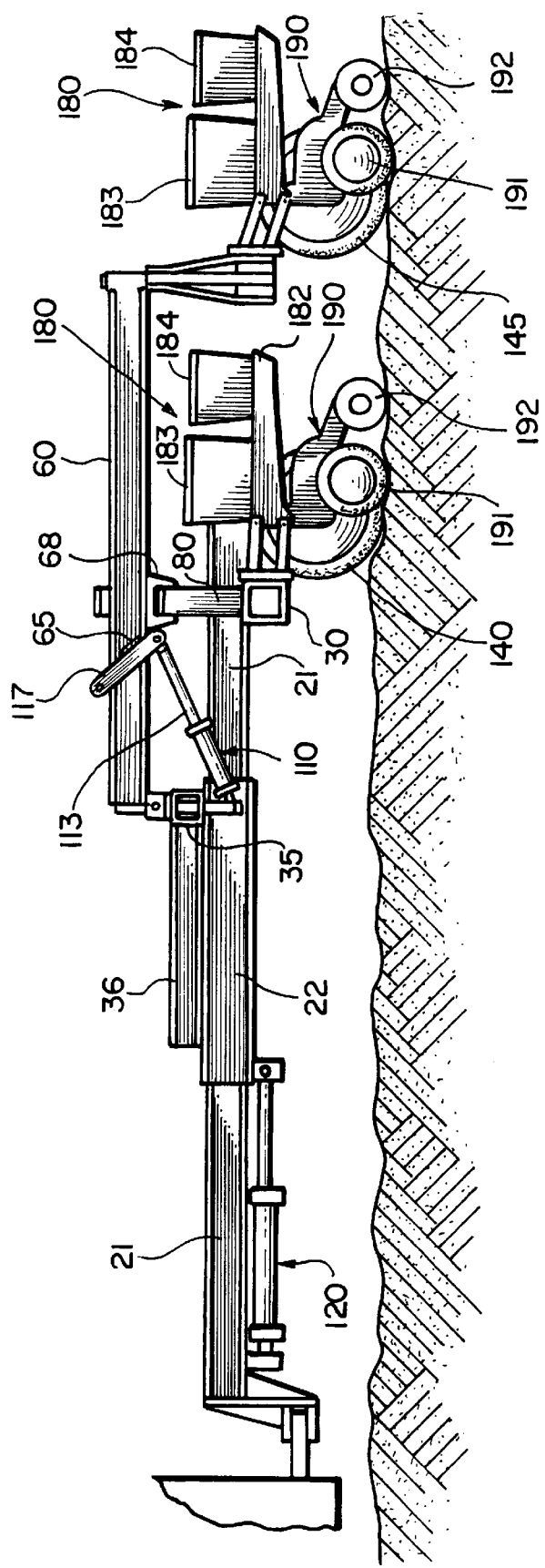
FIG. 4 is a side elevational view of the planter in the position illustrated in FIG. 3.

Mechanism used in moving the folding planter frame 20 from the 30 inch planting position as illustrated in FIG. 1 to the 15 inch planting position or transport position shown in FIG. 3 is illustrated in FIGS. 4 and 5. The mechanism 120 includes a hydraulic cylinder 121 mounted to the underside of center support tube 21 and more particularly to the support plate 27. The hydraulic cylinder 121 has a piston 122 connected to a sleeve or tube 22 which slides along the support tube or tongue 21 from a forward position shown in FIG. 1 for 30 inch spacing to a rearward position shown in FIG. 3 for narrower or 15 inch spacing.

Referring now to FIGS. 1 and 3, there are illustrated four lift wheels 140 mounted to the fixed bar 30 at predetermined spaced intervals with two of the lift wheels 140 being positioned on each side of the frame member or tongue 21 and the sleeve 22 thereon. Each of the wing members 40 is provided with two lift wheels 145 and each of the lift wheels 140 and 145 is provided with a well known mechanism (not shown) for lifting the wheels 140 and 145 when planting (see FIG. 4) and lowering the wheels 140 and 145 when transporting the planter frame 20, as seen in FIG. 5

A plurality of row units 180, each identical, are mounted to the fixed bar 30 and the outboard wing members 40. As illustrated, each wing member 40 carries four row units 180 and the fixed center bar 30 carries eight row units 180. A center-line row unit 200 which is the same as the row units 180 is provided when the planter is in the 15 inch planting position to avoid leaving a 30 inch opening which would occur if the center-line unit 200 were not provided.

Turning now to the row units 180, each of the row units is provided with platform structure 181 which is generally rectangular and is provided with side walls 182 including an end wall. Hoppers 183 and 184 are mounted on the platform 181 in a well known manner. Each of the row units 180 is mounted to the respective bar 30 or member 40 by means of mounting structure 186 connected to the respective bar 30 or member 40 by a pair of upper links 187 and a pair of lower links 188 pivotally mounted to the structure 186 and to the platform structure 181 to permit the individual row units 180 to move up and down with respect to the bar 30 or member 40 to accommodate variations in terrain. Positioned below the platform structure 181 is an undercarriage frame 190 which carries a gauge wheel 191 and a pair of inwardly canted closing wheels 192. It is understood that various other structures may be mounted on the row units 180 such as opening wheels, planting mechanism or the like. The gauge wheels 191 as well as the closing wheels 192 operate in a manner well known to those of ordinary skill in this art.

Referring now to FIG. 5, the folding frame planter 20 is in the transport portion. In the transport position swing cylinder 90 is positioned so that the inboard strut 50 and the outboard strut 60 are in alignment with the upper notches 71 and 81 in the stands 70 and 80 respectively. The cylinders, both the inboard and the outboard lift cylinders 100 and 110 which are slaved have been extended so that the links 107 and 117 respectively bear against the stops 58 and 65 to lift the inboard strut 50 and the outboard strut 60 to the position illustrated in FIG. 5. Because of the rest member 68 on the bottom of the outboard strut 60, the outboard stand 80 is lower than the inboard stand 70 thereby providing clearance for the struts 50 and 60 as they swing from the 30 inch planting position to either the 15 inch planting position or the transport position. In the transport position, with the inboard struts 50 and 60, respectively positioned on their associated stands 70 and 80, the lift wheels 140 are moved downwardly by mechanism (not shown) so as to elevate the respective row units 180 on the fixed bar 30 with respect to the lift wheels 140. In this position, the folding planter frame 20 is in condition to be trailed down the road. Preferably, in the lift position, the wheel mechanism operates independently for the center lift wheels 140 and the wing lift wheels 145 to allow the center lift wheels 140 to be lowered for the transport position. It should be noted that because the inboard and outboard struts 50 and 60, respectively, are mounted on the inboard notch 71 and outboard notch 81 of the stands 70 and 80, the width of the folding planter frame 20 is 30 inches narrower in the transport position than in the 15 inch planting position. This facilitates transport of the folding planter frame 20.

When the folding planter frame 20 is moved from the transport position illustrated in FIG. 5 to the 15 inch row planting position illustrated in FIG. 3, the lift cylinders 100 and 110 are actuated to raise the wing members 40 relative to the bar 30 in order to free the inboard strut 50 and outboard strut 60 from the stands 70 and 80 respectively. Thereafter, the swing cylinder 90 is actuated and the struts 50 and 60 are moved from above the upper notches 71 and 81, respectively, to above the lower notches 72 and 82. Thereafter, the lift cylinders 100 and 110 are retracted to the lower the struts 50 and 60 into the outboard notches 72 and 82. The lift wheels 145 are lowered by suitable mechanism so that the lift wheels 145 and the lift wheels 140 are generally coplanar as are the row units 180 mounted on the fixed bar 30 and the wing members 40. When the frame 20 is in the 15 inch row position, the center line row unit 200 is attached as previously discussed to provide 15 inch spacing center line to center line for all of the row units 180, there being 17 row units in the 15 inch planting position and 16 row units in the 30 inch planting position.

When it is desired to move the unit 20 from the 15 inch planting position to the 30 inch planting position, suitable mechanism is actuated to raise the wing member lift wheels 145. Thereafter, the lift cylinders 100 and 110 are actuated to extend the pistons 103 and 113, respectively, to cause the links 107 and 117, respectively, to engage the stops 58 and 65 to raise the inboard strut 50 and the outboard strut 60 simultaneously thereby elevating the wing members 40 with respect to the center bar 30. After the wing members 40 are elevated sufficiently to clear the angle iron 76 and 86 of the stands 70 and 80, respectively, the swing cylinders 90 are actuated to swing the wing members 40 outboard of the center unit 30. The mechanism 120 is thereafter actuated to move the sleeve 22 and the wing members 40 carried thereby forwardly. When the wing members 40 have reached a position wherein the wing members 40 are in alignment with the center bar 30, the swing cylinders 90 are deactuated and the wing lift wheels 145 lowered to the planting position by the standard mechanism. Locking mechanism (not shown) is engaged between each of the wing members 40 and the central bar 30 to provide rigidity to the entire unit. The planter frame 20 is now in the 30 inch row planting condition and may be moved along in this position to plant rows of corn, to fertilize or to perform other tasks as desired.

Figure 7:
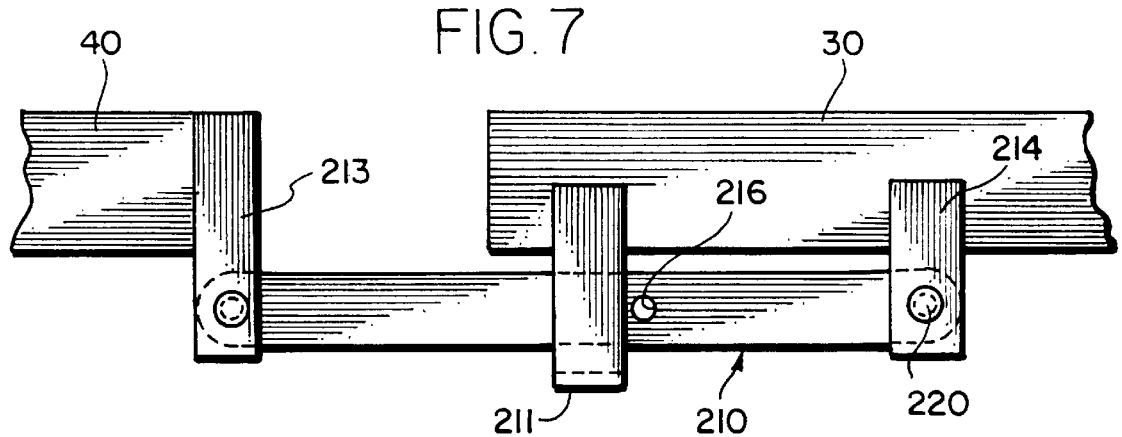
FIGS. 7–9 show perspective views of reinforcing mechanism for the planter.
Figure 8:
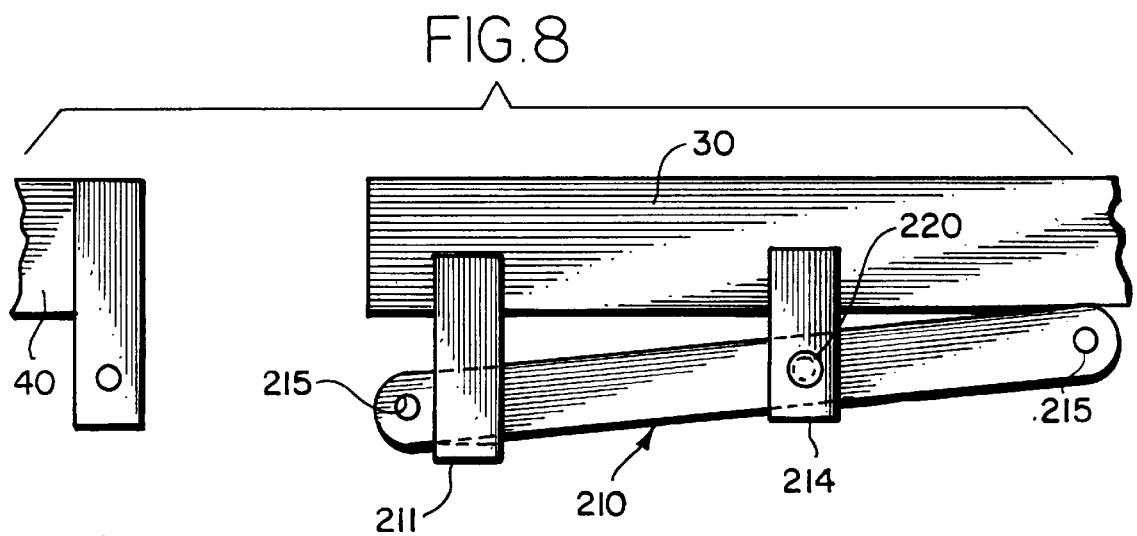
Figure 9:
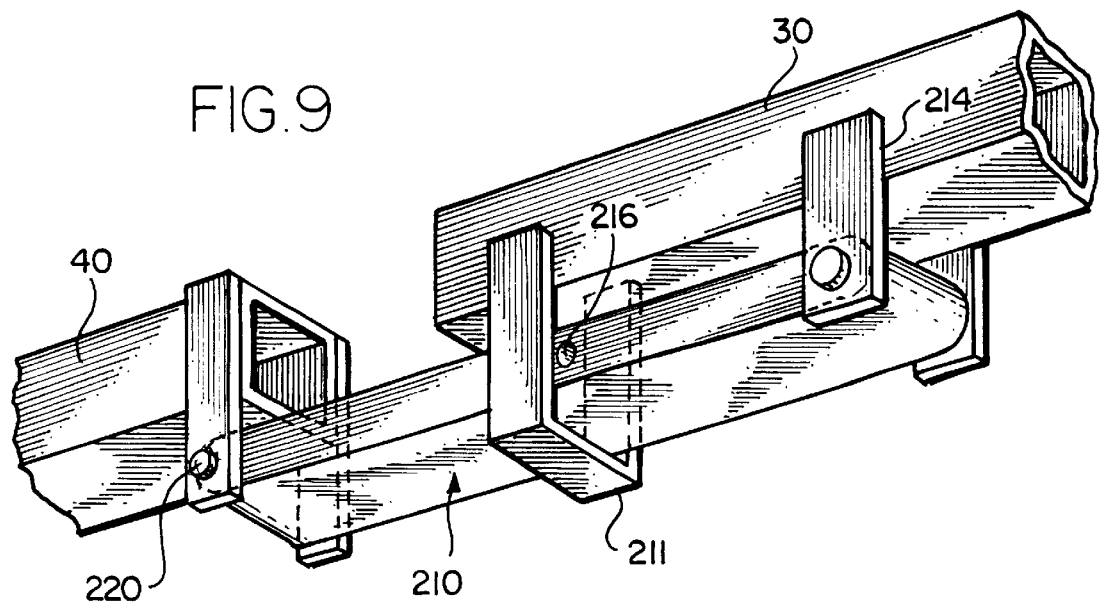

Referring now to FIGS. 7–9, there is shown a stabilizing mechanism for when the planter 20 is in the corn planting position illustrated in FIG. 1 and the cross bars 30 and wing bars 40 are coaxially aligned. In such a position, it is desirable to have a stabilizing bar 210 connected between the wing bars 40 and the central fixed cross bar 30 to prevent the wing bars 40 from being dragged through friction out of coaxial alignment with the bar 30 during forward and rearward movement through the field. The stabilizing bars 210, of which there are two, are mounted through a strap 211 mounted near each end of the fixed bar 30 and mounting members 213 at the end board end of each wind member 40 and a mounting member 214 in board of the strap 211 on the fixed member 30. Each of the mounting members 213 and 214 are provided with apertures through which a pin 220 can be inserted so as position the stabilizing bars 210 in the position shown in FIG. 7 for stabilizing the planter 20 when it is in the configuration shown in FIG. 1 and for maintaining the stabilizing bar 210 out of stabilizing position as shown in FIG. 8 when the planter 20 is either in the 15 inch or sow bean planting position or in the travel position, previously discussed. As seen from FIGS. 7–9, pins 220 are used to fix the stabilizing bars 210 either in the position shown in FIG. 7 or in the position shown in FIG. 8, so as easily to enable the planter 20 to be in a position shown in FIG. 1 or in position shown in FIGS. 4 and 5 without requiring an undue amount of time or effort.

In order to move the folding planter frame 20 from the 30 inch planting position to the transport position, the following steps are taken: first the locks between the center bar 30 and the wing members 40 are disengaged. Thereafter, the lift cylinders 100 and 110 are actuated to lift the wing members 40 to an elevated position. Thereafter, the mechanism 120 is actuated to move the sleeve 22 and the movable bar 35 rearwardly along the center tube 21, that is the slidable sleeve 22 is moved rearwardly along the center tube 21 to the position shown in FIG. 3. Thereafter, the swing cylinders 90 are actuated to move the wing members 40 to the position where the struts 50 and 60 are in registry with the upper notches 71 and 81 of the inner and outer stands 70 and 80, respectively. Thereafter, the pistons 103 and 113 of lift cylinders 100 and 110 are withdrawn to permit the struts 50 and 60 to settle downwardly onto the notches 71 and 81, respectively. In this position, the planter frame 20 is in condition to be transported along the road. Of course, the lift wheels 140 mounted on the center bar have to be lowered into the transport position by actuation of standard mechanism and thereafter the unit 20 can be trailed along the road as previously described.

While there has been disclosed what is considered to be the preferred embodiment of the present invention, it is understood that various changes in the details may be made without departing from the spirit, or sacrificing any of the advantages of the present invention.

Referring now to FIGS. 7–9, there is shown a stabilizing mechanism for when the planter 20 is in the corn planting position illustrated in FIG. 1 and the cross bars 30 and wing bars 40 are coaxially aligned. In such a position, it is desirable to have a stabilizing bar 210 connected between the wing bars 40 and the central fixed cross bar 30 to prevent the wing bars 40 from being dragged through friction out of coaxial alignment with the bar 30 during forward and rearward movement through the field. The stabilizing bars 210, of which there are two, are mounted through a strap 211 mounted near each end of the fixed bar 30 and mounting members 213 at the end board end of each wind member 40 and a mounting member 214 in board of the strap 211 on the fixed member 30. Each of the mounting members 213 and 214 are provided with apertures through which a pin 220 can be inserted so as position the stabilizing bars 210 in the position shown in FIG. 7 for stabilizing the planter 20 when it is in the configuration shown in FIG. 1 and for maintaining the stabilizing bar 210 out of stabilizing position as shown in FIG. 8 when the planter 20 is either in the 15 inch or sow bean planting position or in the travel position, previously discussed. As seen from FIGS. 7–9, pins 220 are used to fix the stabilizing bars 210 either in the position shown in FIG. 7 or in the position shown in FIG. 8, so as easily to enable the planter 20 to be in a position shown in FIG. 1 or in position shown in FIGS. 4 and 5 without requiring an undue amount of time or effort.

What is claimed is:

1. In an agricultural device for transporting planting units having containers for storing and dispensing material including tillage attachments through a field at different spacings by a motored vehicle, a tongue in communication with a motored vehicle extending rearwardly of the vehicle in a direction parallel to the direction of travel of the vehicle, and a first toolbar having a longitudinal axis extending perpendicularly to said tongue and carrying a plurality of planting units thereon at fixed intervals, the improvement comprising: a second toolbar spaced away and separate from said first toolbar and having a longitudinal axis extending perpendicularly to said tongue and carrying a plurality of planting units thereon at fixed intervals, a motor mechanism in communication with said second toolbar for moving said second toolbar between a first position wherein said first and said second toolbars are positioned with their longitudinal axes generally colinear and a second position wherein said second toolbar is spaced from said first toolbar and the longitudinal axes of the first and second toolbars are parallel, said motor mechanism moving said second toolbar upwardly and inwardly from the first position to the second position, said second toolbar in the second position thereof positioning the planting units carried thereon intermediate the planting units carried on said first toolbar, whereby to provide an agricultural device capable of positioning the planting units carried thereby in at least two different spacings depending upon whether said second toolbar is in the first or the second positions thereof.

2. The agricultural device of claim of claim 1, wherein the second toolbar is outboard of said first toolbar in the first position and is rearward of said first toolbar in the second position.

3. The agricultural device of claim 2, wherein the planting units are about 30" apart when the second toolbar is in its first position and about 15" apart when the second toolbar is in its second position.

4. The agricultural device of claim 3, wherein said second toolbar has a third position for transport inboard and elevated with respect to the second position.

5. The agricultural device of claim 4, and further including support mechanism mounted on said first toolbar for supporting said second toolbar in the second position thereof and in the third position thereof.

6. The agricultural device of claim 4, wherein each of the planting units carried by said second toolbar is substantially aligned with a corresponding planting unit carried by said first toolbar when said second toolbar is in the third transport position thereof.

7. In an agricultural device for transporting planting units having containers for storing and dispensing materials including tillage attachments through a field at different spacings by a motored vehicle, a first toolbar having a longitudinal axis extending generally perpendicularly to the direction of travel of the vehicle and carrying a plurality of planting units thereon at fixed intervals, the improvement comprising: second and third toolbars each having a longitudinal axis extending generally parallel to said first toolbar and carrying a plurality of planting units thereon at fixed intervals, hydraulic mechanism in communication with said second and third toolbars for moving said second and third toolbars between a first position wherein said first, second and third toolbars are positioned with their longitudinal axes generally colinear and a second position wherein said second and third toolbars are hydraulically elevated and thereafter spaced from said first toolbar such that the longitudinal axes of the first, second and third toolbars are parallel, said second and third toolbars in the second positions thereof positioning the planting units carried thereon intermediate the planting units carried on said first toolbar, whereby to provide an agricultural device capable of positioning the planting units carried thereby in at least two different spacings depending upon whether said second and third toolbars are in the first or the second positions thereof.

8. The agricultural device of claim 7, wherein said second and third toolbars are each positioned outboard of said first toolbar when said second and third toolbars are in the first position thereof.

9. The agricultural device of claim 8, wherein said second and third toolbars are sufficiently elevated during movement between the first and second positions thereof to pass over certain planting units mounted on said first toolbar.

10. The agricultural device of claim 9, wherein said second and third toolbars are moved perpendicularly to the longitudinal axis of said first toolbar during movement between the first and second positions thereof.

11. The agricultural device of claim 10, wherein vertically extending supports mounted on said first toolbar support said second and third toolbars in the second position thereof.

12. An agricultural device for transporting a plurality of planting units implements through a field comprising a tongue extending generally parallel to the direction of travel of the device and adapted to be connected to a powered vehicle, a first toolbar mounted perpendicularly to said tongue carrying a plurality of planting units thereon, a second toolbar mounted perpendicularly to said tongue, separate from said first toolbar and carrying a plurality of planting units thereon, a hydraulic mechanism in communication with one of said first and second toolbars for lifting one of said toolbars above the other of said toolbars to position the lifted one of said toolbars above another toolbar, said hydraulic mechanism being capable of positioning one of said toolbars in at least two different fixed positions with respect to the other toolbar, one of said fixed positions being an operating position wherein the agricultural device is capable of performing agricultural tasks and another fixed position being a transportation position for reducing the overall width of the agricultural device during transportation along a road and the one of said toolbars is above and behind another of said toolbars, wherein the first and second toolbars are positioned coplanar in the operating position.

13. An agricultural device for transporting a plurality of planting units having containers and tillage attachments through a field comprising a tongue extending generally parallel to the direction of travel of the device and adapted to be connected to a powered vehicle, a first toolbar mounted perpendicularly to said tongue and carrying planting units thereon, a second toolbar mounted perpendicularly to said tongue separate from said first toolbar and carrying planting units thereon, hydraulic mechanism in communication with at least one of said first and second toolbars for moving at least one of said first and second toolbars toward and away from the other toolbar, said hydraulic mechanism being capable of positioning one of said toolbars in at least two different fixed positions with respect to the other toolbar, two of said fixed positions being operating positions wherein the agricultural device is capable of performing agricultural tasks with the planting units being spaced at different distances from each other and the agricultural device in another of fixed positions is elevated and is capable of being transported along a road with the overall width of the agricultural device being reduced in the transportation position.

14. An agricultural device for transporting planting units having containers for storing and dispensing material including tillage attachments through a field at different spacings including a tongue connection to a motored vehicle, a first toolbar having a longitudinal axis extending generally perpendicularly to the direction of travel of the motored vehicle and carrying a plurality of planting units mounted thereon at fixed intervals, a sleeve mounted for sliding movement on said tongue having a cross piece fixed thereto for sliding movement on said tongue toward and away from said first toolbar, second and third toolbars spaced from said first toolbar and each having a longitudinal axis extending generally parallel to said first toolbar and each carrying a plurality of planting units thereon at fixed intervals, struts pivotally connected to said cross piece and said second and third toolbars, hydraulic mechanism in communication with said sleeve and said second and third toolbars for moving said second and third toolbars between a first position wherein said first, second and third toolbars are positioned with their longitudinal axes generally colinear and a second position wherein said sleeve moves relative to said first toolbar with said second and third toolbars being elevated to pass over at least some planting units mounted on said first toolbar and thereafter spaced from said first toolbar such that the longitudinal axis of said first toolbar, said second and third toolbars in the second positions thereof positioning the planting units carried thereon intermediate the planting units carried on said first toolbar, whereby to provide an agricultural device capable of positioning the planting units carried thereby in at least two different spacings depending upon whether said second and third toolbars are in the first or the second positions thereof.

15. The agricultural device of claim 14, wherein said second and third toolbars have a third position thereof inboard of said second position for transport of the agricultural device along a road.

16. The agricultural device of claim 14, wherein said first toolbar is mounted below said tongue and said cross piece is mounted on the top of said sleeve.

17. The agricultural device of claim 14, wherein said struts are mounted for pivotal movement with respect to said struts both horizontally and vertically.

18. The agricultural device of claim 14, wherein each of said second and third toolbars is connected to said cross piece by a pair of struts.

19. The agricultural device of claim 18, wherein each strut is mounted to its respective toolbar at one end thereof for horizontal pivotal movement and each strut is mounted to the cross piece for pivotal movement both horizontally and vertically.

20. The agricultural device of claim 19, wherein each strut is connected to a hydraulic cylinder mounted on said cross piece for movement between the first and second positions thereof.

21. The agricultural device of claim 20, wherein each hydraulic cylinder is pivotally connected to a link mounted on the associated strut, said link bearing against a stop mechanism on said strut during lifting of said strut during movement from the first position to the second position of the toolbar mounted to the strut.

22. The agricultural device of claim 21, and further comprising stands mounted on said first toolbar for holding said struts in the second positions thereof.

23. The agricultural device of claim 22, wherein each stand has a lower planting position for holding a respective one of said second and third toolbars in the second positions thereof and a higher inward transporting position for holding the respective one of said second and third toolbars in a transportation position in which the second and third toolbars are elevated and inboard with respect to their second positions.

24. The agricultural device of claim 14 and further including a single detachable planting unit for connection to said tongue rearward of said first toolbar.

25. In an agricultural device for transporting planting units having containers for storing and dispensing material including tillage attachments through a field at different spacings by a motored vehicle, a tongue in communication with a motored vehicle extending rearwardly of the vehicle in a direction parallel to the direction of travel of the vehicle, and a first toolbar having a longitudinal axis extending perpendicularly to said tongue and carrying a plurality of planting units thereon at fixed intervals, the improvement comprising: a second toolbar spaced away and separate from said first toolbar and having a longitudinal axis extending perpendicularly to said tongue and carrying a plurality of planting units thereon at fixed intervals, a motor mechanism in communication with said second toolbar for moving said second toolbar between a first position wherein said first and said second toolbars are positioned with their longitudinal axes generally colinear and a second position wherein said second toolbar is spaced from said first toolbar and the longitudinal axes of the first and second toolbars are parallel and a third position wherein said second toolbar is position nearer to said tongue than when said second toolbar is in the first or the second positions thereof, said second toolbar in the second position thereof positioning the planting units carried thereon intermediate the planting units carried on said first toolbar and said second toolbar in the third position thereof facilitating road travel, whereby to provide an agricultural device capable of positioning the planting units carried thereby in at least two different spacings depending upon whether said second toolbar is in the first or the second positions thereof and having a transportation position in which the overall width of the device is narrower than in either the first or second positions.

26. The agricultural device of claim 25, wherein the second toolbar in the third position thereof is rearward of and elevated with respect to said first toolbar.

* * * * *